Dec. 28, 1937.  D. R. DE TAR  2,103,517
DRIVE MECHANISM
Filed Aug. 2, 1935  2 Sheets-Sheet 1
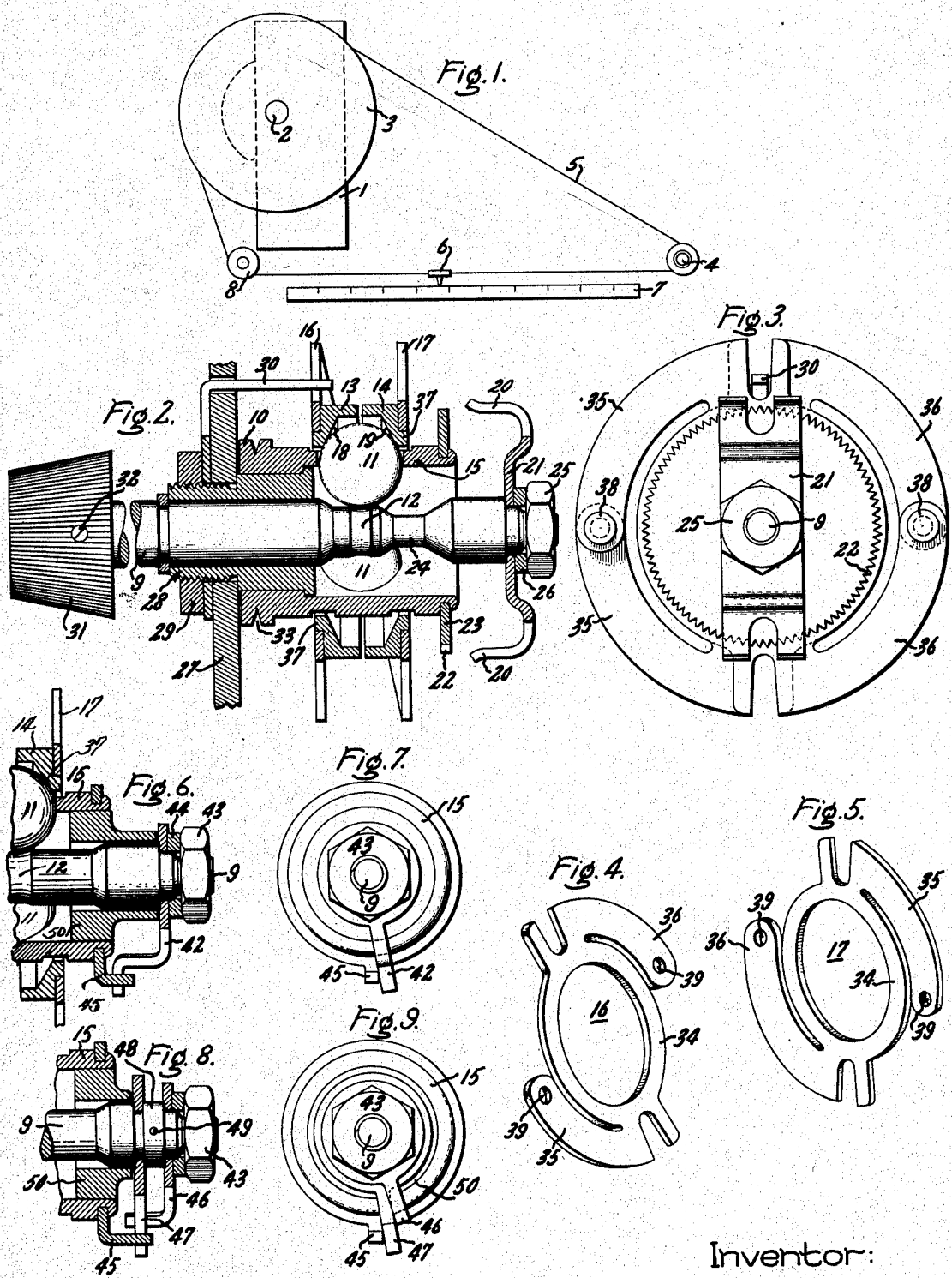
Inventor:
Donald R. De Tar,
by Harry E. Dunham
His Attorney.

Dec. 28, 1937.  D. R. DE TAR  2,103,517
DRIVE MECHANISM
Filed Aug. 2, 1935  2 Sheets-Sheet 2
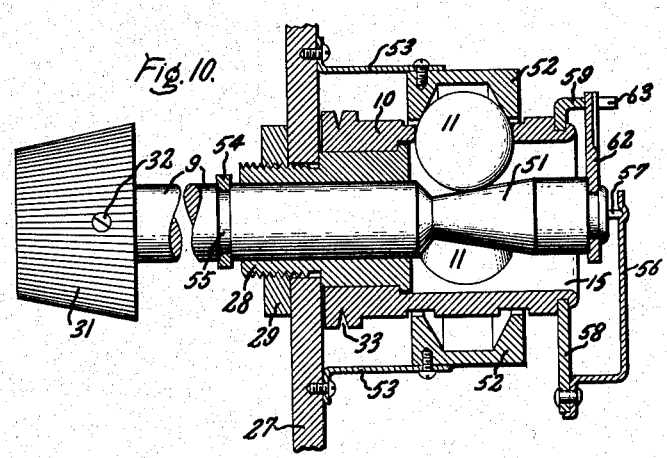
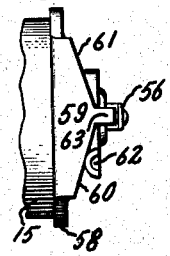
Inventor:
Donald R. De Tar,
by Harry E. Dunham
His Attorney.

Patented Dec. 28, 1937

2,103,517

UNITED STATES PATENT OFFICE 2,103,517

DRIVE MECHANISM

Donald R. De Tar, Stratford, Conn., assignor to General Electric Company, a corporation of New York Application August 2, 1935, Serial No. 34,423

18 Claims. (Cl. 74—10)

My invention relates to drive mechanisms for use in the adjustment of circuit elements, such, for example, as the tuning control elements employed in high frequency apparatus. It relates more particularly to drive mechanisms of the variable speed type.

One of the objects of my invention is to improve the construction of such drive mechanisms whereby they may be more economically manufactured, are more compact when assembled and, at the same time, are rugged and reliable in operation.

A further object of my invention is to provide improved means whereby the speed at which the element to be controlled is varied.

In variable speed drive mechanisms of the prior art it is necessary, in adjusting the speed ratio of the mechanism, to effect a selective operation solely for the purpose of changing the speed ratio of the device. A further object of my invention is to provide means whereby the desired speed ratio is automatically determined without any selective operation, the desired ratio being automatically chosen in response to the range of movement of the control device.

Ordinarily reduction drive is desired only for fine adjustment of the circuit elements requiring relatively small movements of the control member, whereas a unity speed ratio is desirable to effect larger adjustments of the circuit elements. In accordance with one form of my invention the desired speed selection is, therefore, effected in response to the range of movement of the control member.

The novel features which I believe to be characteristic of my invention are set forth with particularity in the appended claims. My invention itself, however, both as to its organization and the method of operation, together with further objects and advantages thereof, will best be understood by reference to the following specification taken in connection with the accompanying drawings in which Fig. 1 is a diagrammatic illustration of a tuning system in which my improved control device may be used; Fig. 2 is a side view partially in section illustrating one form of my improved control device; Fig. 3 is an end view of the device shown in Fig. 2; Figs. 4 and 5 are detail views of certain of the elements shown in Fig. 2; Figs. 6 and 7 illustrate the details of one form of direct drive coupling means constructed in accordance with my invention and which may be applied to the control device shown in Fig. 2; Figs. 8 and 9 illustrate a modification of the coupling means shown in Figs. 6 and 7; and Figs. 10 and 11 illustrate an additional embodiment of my improved control device.

Referring to Fig. 1 of the drawings I have shown, by way of example, one form of tuning arrangement in which my improved control device may be conveniently incorporated. The arrangement illustrated comprises a tuning element shown in the form of a variable condenser 1 having a rotor shaft 2 upon which is mounted a pulley 3. A manually operable control device 4 is arranged to transmit rotation of its control shaft to the pulley 3 by means of a cord 5 which traverses the pulley 3 and also a pulley on the control shaft of the device 4.

The tuning element 1 may form a part of a radio receiving circuit as, for example, a variable condenser for tuning an input circuit to any desired frequency. Although I have illustrated the device 4 as controlling a single element 1, it will of course be understood that it may be used to control a plurality of such elements in synchronism and, indeed, the latter is the usual arrangement. In the application mentioned it is desirable to provide suitable means for indicating to the operator the frequency to which the set is tuned, in order that the tuning operation may be intelligently performed. In the arrangement illustrated this means comprises a pointer 6 mounted on the cord 5, which cooperates with a scale 7 suitably calibrated to indicate the position of the rotor shaft 2 following an adjustment thereof by the control device 4. In order to maintain the pointer 6 in the correct position with respect to the scale 7, an idler pulley 8 is provided over which the cord 5 extends.

In the operation of the above-described tuning system to adjust the tuning element 1 to the correct position such that the circuit in which the element is connected is correctly tuned to the desired frequency, the operating member of the device 4 is rotated to drive the pulley 3 through the cord 5 until the correct adjustment is obtained. During such rotation the pointer 6 moves along the scale 7 to indicate to the operator the particular frequency or station to which the circuit is adjusted.

It is desirable in arrangements of the above character, in order quickly and accurately to adjust the apparatus to the desired frequency, to provide a control device 4 in which the control member may be driven from the operating member at two different speeds.

I have illustrated in Figs. 2 and 3, a control device of improved construction having the desired dual speed operating characteristic. As shown, the device comprises an operating member 9 which is arranged selectively to transmit rotary motion to a control member 10, either at a reduced speed through a planetary reduction drive mechanism or directly through a direct drive coupling.

The reduction drive mechanism includes a plurality of balls or rollers 11 positioned between an inner raceway 12 provided in the shaft 9 and an outer stationary raceway formed by the members 13 and 14. Planetary movement of the balls 11 about the stationary outer raceway in response to rotation of the shaft 9 causes rotation of the control member 10 through the engagement of the balls 11 with the sides of peripheral openings provided in the right tubular portion 15 of the control member 10. During such rotation of the shaft 9 to drive the member 10 the inner and outer raceways are held in firm non-slipping engagement with the balls by means of springs 16 and 17 which bias the members 13 and 14 together thereby to exert an inwardly directed component of force of the balls through the tapered bearing surfaces 18 and 19. A direct drive coupling between the members 9 and 10 may be obtained by axially shifting the member 9 to the left to bring the ends of the arms 20 of a resilient U-shaped member 21 into engagement with the knurled surface 22 of an annular member 23 mounted on the control member 10, and to release the balls 12 from engagement with the two raceways thereby to permit the same to ride in the deep groove 24 provided in the shaft 9. With the elements in this position and during rotation of the shaft 9 a unity speed ratio exists between the members 9 and 10. It will, of course, be understood that with the elements in this position and in order to transmit movement between the operating and control members, the U-shaped member 21 must be fixedly secured to the shaft 9 and I have shown such securing means as comprising a nut 25 screwed onto the threaded end of the shaft 9 and butting a lock washer 26 to press the member 21 into engagement with a stepped portion of the shaft.

The device described above may be mounted on a supporting wall 27 by means of the threaded extremity of a bearing member 28 and a nut 29. A finger 30 is provided which passes through an opening in the wall 27 and extends into a slot provided in the spring 16 thereby to maintain the outer raceway stationary. The finger 30 includes an annular base portion which is pressed between the nut 29 and the wall 27. In order to facilitate adjustment of the device a knob 31 is provided which is mounted on the left extremity of the operating shaft 9 by means of a set screw 32. Motion may be transmitted from the control member 10 to the elements to be adjusted by a cord positioned to ride in the V groove 33 cut in the member 10.

In the preferred construction of this embodiment of my improved control device the springs 16 and 17 are of the form illustrated in Figs. 4 and 5. As shown, each of the spring members 16 and 17 includes an annular portion 34 and spring arms 35 and 36. The annular portions 34 are fixedly mounted on steps 37 formed by recesses in the members 13 and 14. As shown in Figs. 2 and 3 the arms 35 and the arms 36 of the members 16 and 17 are respectively biased toward each other and are secured together at their ends by rivets 38 which extend through openings 39 in the ends of the arms. It will be seen that since each of the pairs of arms 35 and 36 are biased toward each other the tapered bearing surfaces will also be biased toward each other thereby to force the balls 12 into firm engagement with the inner and outer raceways.

By forming the outer raceway of the two solid annular members 13 and 14 and employing the springs 16 and 17 to bias the members toward each other a rugged, economical structure is obtained which is easily assembled and which is reliable in operation. Thus, the springs 16 and 17 may be stamped from spring steel at a low cost. In addition, the ruggedness of the members 13 and 14 resists wear caused by the planetary motion of the balls about the tapered bearing surfaces 18 and 19.

From the foregoing description it will be observed that a speed selective operation is necessary to change the speed ratio between the operating member 9 and the control member 10. In the specific control device described this operation is carried out by axially shifting the operating member 9 between its two operating positions.

In accordance with one feature of my invention means are provided whereby no operation, independent of the tuning operation, is necessary to change the speed ratio between the control and operating members. One embodiment of this means is shown in Figs. 6 and 7 as comprising a finger 42 mounted on one end of the shaft 9 by means of a nut 43 and lock-washer 44 and arranged to engage after a predetermined range of movement a cooperating finger 45 which is fixedly mounted on the control member 10. As shown in Fig. 7 the predetermined range of movement corresponds to substantially one complete revolution of the shaft 9.

With the arrangement described in the preceding paragraph and in order to secure a direct drive coupling between the members 9 and 10, it is only necessary to rotate the shaft 9 in either direction until the fingers 42 and 45 engage each other. Following such engagement and during further rotation of the shaft 9 in the same direction the control member 10 is driven at the same speed as that of the shaft 9 until the approximate desired adjustment of the apparatus being controlled is obtained. After the rough adjustment is completed a vernier or accurate adjustment may be secured by reversing the direction of rotation of the shaft 9 thereby to bring the reduction drive mechanism into action. If a reduction drive arrangement of the type illustrated in Figs. 2 and 3 be employed, it will be understood that a reversal of the direction of rotation of the shaft 9 causes movement of the member 10 through the reduction drive mechanism including the balls 18.

It will be observed that the range of movement of the shaft 9 corresponding to a disengaged condition of the fingers 42 and 45 is limited to substantially one complete revolution of the shaft 9 which, of course, means that the range of reduction drive is also limited to substantially one revolution of the member 9. It follows that in order to bring the elements of the control device to a position such that the reduction drive mechanism may be effectively utilized to perform the vernier adjustment, it is necessary to rotate the directly coupled members 9 and 10 to a point slightly beyond the position corresponding to an exact adjustment of the apparatus being controlled.

In order to secure an increased operating range for the reduction drive mechanism, the embodiment of my invention illustrated in Figs. 8 and 9 may be employed. In this embodiment a finger 46 is fixedly mounted on the operating member 9 and is arranged to engage a finger 47 which is rotatably mounted on the shaft 9. Preferably the finger 47 is rotatably supported on the shaft 9 within the annular recess formed by an annular member 48, the latter member being mounted on the shaft 9 by a pin 49. The finger 47 is arranged to engage, after a predetermined movement thereof, the finger 45 which is fixedly mounted on the control member 10; the range of movement being limited to one revolution of the finger 47. The finger 46 is in turn arranged to engage the finger 47 after a predetermined amount of rotation limited to one revolution of the shaft 9.

With the elements of this embodiment of my improved control device in the position shown in Fig. 9, rotation of the shaft 9 in a counterclockwise direction through approximately one revolution brings the fingers 46 and 47 into engagement, and further rotation of the shaft 9 in the same direction for slightly less than another revolution brings the fingers 47 and 45 into engagement to establish a direct drive coupling between the members 9 and 10. It will thus be seen that the provision of the three fingers operating to establish a direct drive between the members 9 and 10 in the manner described, increases the range of movement for the reduced speed drive connection between the operating shaft 9 and the control member 10 to substantially two complete revolutions of the shaft 9. Of course, any desired number of intermediate members, such as 47, may be employed thereby to increase the range of movement of the operating shaft 9 for reductive drive and before direct drive at unity ratio obtains.

The use in a tuning mechanism of the coupling arrangement illustrated in Figs. 6 and 7 or 8 and 9 requires modification of the control device shown in Fig. 2 only to the extent indicated in these figures, the portion of the operating mechanism to the left of the balls 11 being precisely identical with that shown in Fig. 2. Elements 11, 14, 17 and 37 of Fig. 6 are not shown in Fig. 8 for simplicity of the drawing but it will, of course, be understood that such elements are present in the device to which Figs. 8 and 9 pertain. These latter figures indicate modifications of the device over that indicated in Figs. 6 and 7. Since axial motion of the shaft 9 is no longer desirable, however, it is necessary to provide a means for retaining the shaft 9 in a fixed axial position. Accordingly I provide an annular member 50 mounted within the right end of the tubular portion 15 of the control member 10. The member 50 is provided with an opening through which the shaft 9 extends and the end of this member forms a stop for preventing axial displacement of the shaft 9.

As is apparent in Fig. 6 the modified direct drive coupling shown in this figure permits the deep groove 24 of Fig. 2 to be dispensed with since it serves no useful purpose in the operation of the device. In the operation of such a modified device and during rotation of the shaft to drive the control member 10 directly through the fingers 42 and 45, the balls 11 are at all times in frictional engagement with, and are caused to slip about, the bearing surface of the outer raceway.

In order to retain the advantageous operating features of the direct coupling mechanism shown in Fig. 6 or 8 and, at the same time, eliminate any friction between the component parts of the mechanism when the device is being operated at either of its two speeds, the arrangement illustrated in Figs. 10 and 11 may be employed. In this embodiment of my invention the inner ball raceway is in the form of a tapered bearing surface 51 provided in the shaft 9 and the outer stationary raceway comprises a solid annular member 52 which may be supported from the wall 27 by brackets 53. A retaining ring 54 is mounted in a groove 55 in the operating shaft 9 in such a position that a slight axial movement of the shaft 10 is permitted. As shown in Fig. 10, the shaft 9 is biased to the left by a spring member 56 which engages at one end a pin 57 provided at the right end of the shaft 9; the spring member 56 being mounted on a support member 58 which is fixedly mounted on the right end of the control member 10.

The member 58 may be stamped from heavy sheet metal stock and, as shown in Fig. 11, is provided with an overturned portion 59 which extends at right angles to the surface of the main portion of the member 58. The overturned portion 59 is provided with a pair of cam surfaces 60 and 61 which cooperate with a finger 62 mounted on the operating shaft 9 to shift axially the shaft 9 to the right against the bias of the spring 56 when the member 9 is rotated a sufficient amount in either direction to cause the finger 62 to ride up one of the cam surfaces 60 or 61. Axial displacement of the shaft 9 to the right increases the depth of the inner raceway by virtue of the tapered characteristic of the bearing surface 51 and thereby releases the balls 11 from engagement with the two ball raceways. The overturned segment 59 of the member 58 is provided with a lug or finger 63 at the apex of the angle formed by the cam surfaces 60 and 61. This finger 63 cooperates with the finger 62 to couple the members 9 and 10 in direct drive relation when the two fingers are in engagement.

In the operation of the above-described embodiment of my invention, rotation of the shaft 9 in either direction for a predetermined amount causes the finger 62 to engage and ride over one of the cam surfaces 60 or 61 thereby automatically to shift the shaft 9 axially to the right against the bias of the spring member 56 to release the balls 11 from the inner and outer raceways. As the finger 62 approaches the apex of the angle formed by the cam surfaces it engages the finger 63 and couples the members 9 and 10 in direct drive relation. Further rotation of the shaft 9 in the same direction causes the control member 10 to be driven at the speed of the shaft 9. During rotation of the shaft 9 to drive directly the control member 10, the balls 11 are loosely held in position between the inner and outer raceways and are free to rotate about the outer raceway without frictionally engaging the inner raceway.

With the elements coupled in direct drive relation and, if it be desired to bring the reduction drive mechanism into action, it is only necessary to reverse the direction of rotation of the shaft 9 thereby to disengage the finger 62 from the finger 63 and the associated cam surface 60 or 61 and permit the spring 56 to move the shaft 9 to the left to bring the balls 11 into firm engagement with the inner and outer raceways. After this preliminary movement is complete the shaft 9 may be rotated further in the same direction and the member 9 will drive the member 10 through the balls 11 included in the reduction drive mechanism. The range of movement for the reduction drive coupling is, of course, limited to a portion of a revolution of the shaft 9.

From the foregoing description it will be apparent that I have devised an improved control device which may be embodied in a radio receiving set and which may be easily manipulated rapidly and accurately to tune the set to the desired signal frequency. Since the usual method of tuning a receiving system is that of tuning in one direction slightly beyond the point of maximum response of the set to a selected frequency and then tuning back in the reverse direction until the point of exact response is obtained, it will be seen that with my improved device the reduction drive mechanism is automatically brought into action at the correct time and without any thought or skill on the part of the operator.

Thus, considering the tuning system illustrated in Fig. 1, if the tuning element 1 be adjusted so that the system in which it is connected is tuned to a frequency corresponding to a pointer reading on the left portion of the scale 7 and it be desired to readjust the system to receive a signal having a frequency indicated on the extreme right portion of scale 7, it is desirable to perform the rough adjustment quickly and follow such rough adjustment with a vernier adustment to secure the desired exact tuning. The usual method of tuning includes a back and forth manipulation of the control device 4 after the rough adjustment is completed and in an attempt to obtain a maximum response of the system being tuned to the desired signal frequency. It will be seen that it is advantageous to reduce the speed ratio between the operating and control members when the first reversal of the direction of rotation of the operating member is performed. By using the direct coupling means illustrated in Figs. 6 to 9 inclusive in combination with a control device of the construction illustrated in Figs. 2 and 3 the cooperating fingers establish a unity drive speed ratio almost immediately following rotation of the operating member to move the pointer 6 a substantial distance across the scale and during the preliminary adjustment of the tuning elements. As the operator tunes through the desired signal frequency he naturally reverses the direction of rotation of the operating member to increase the selectivity of response of the set. Such reversal of rotation causes disengagement of the fingers thereby automatically to bring the reduction drive mechanism into action at the exact time that a reduced speed ratio is needed. By increasing the number of fingers employed in the manner illustrated in Figs. 8 and 9 the operating range of the reduced drive coupling may be made sufficiently extensive to maintain a reduced speed ratio even though the rough adjustment is very carelessly performed. The provision of the cooperating fingers mounted respectively on the operating and control members for effecting dual speed control without a speed selective operation on the part of the apparatus being controlled renders possible a quick transition from either speed ratio to the other without the slightest mechanical shock to the apparatus.

By using a device constructed in accordance with the embodiment of my invention illustrated in Figs. 10 and 11 the above-noted advantage of non-selective and automatic speed change is obtained and at the same time friction or drag between the component elements of the mechanism is substantially eliminated. Thus, with the operating member 9 directly coupled to the control member 10, the inner raceway is increased in depth so that the balls 11 are loosely held in position and are free to rotate when they come in contact with the outer raceway. Conversely, when the member 10 is being driven from the operating shaft 9 through the reduction drive mechanism, the fingers 62 and 63 are completely disengaged. It should be noted that the amount of axial movement of the shaft 9 resulting from movement of the finger 62 over either of the cam surfaces 60 or 61 prior to an engagement of the finger 62 with the finger 63 is very small. This, of course, means that the appearance of the control panel is not marred by a noticeable extension of the control shaft 9 from the surface of the panel.

My improved control device possesses a distinct advantage over the type of dual control mechanism known to the art which includes separate operating members for procuring the rough and fine adjustments. This advantage resides in the elimination of unnecessary elements thereby resulting in a less expensive structure as well as a less complicated mode of operation.

It will be seen that in each of the various modifications of my invention shown the structure is of simple and rugged design. It will further be seen that back-lash and play, between the component parts of the device are completely eliminated, thereby assuring positive and reliable operation for a long period of use.

While I have described particular embodiments of my invention, it will of course be understood that I do not wish to be limited thereto since many modifications in the structure may be made, and I contemplate by the appended claims to cover all such modifications as fall within the true spirit and scope of my invention.

What I claim as new and desire to secure by Letters Patent in the United States is:

1. In combination, an adjustable element, a control member coupled to drive said element thereby to adjust said element, an operating member, means for coupling said control and operating members in reduced drive relation while said operating member is rotated over a predetermined range in excess of one complete revolution, and means for automatically coupling said members in direct drive relation when said operating member is rotated in either direction to the limits of said range.

2. In combination, an adjustable element, a control member coupled to drive said element thereby to adjust said element, an operating member, means for coupling said control and operating members in reduced drive relation when said operating member is rotated over a range corresponding to a predetermined number of revolutions of said operating member, and means for coupling said members in direct drive relation when said operating member is rotated in either direction to exceed said range, said last named means comprising a finger mounted on said control member, a second finger rotatably mounted on said operating member and arranged to engage said first finger, and a third finger rigidly mounted on said operating member and arranged to engage said second finger to move said second finger into engagement with said first finger after a predetermined movement of said operating member.

3. In combination, a control member, an operating member, an inner raceway arranged to be rotated with said operating member, a stationary raceway, means including a plurality of balls positioned within said raceways for driving said control member from said operating member at a reduced speed for a predetermined range of rotation of said operating member, means including a finger mounted on said operating member and arranged to engage a finger on said control member for coupling said operating and control members in direct drive relation when said operating member is rotated in either direction to exceed said range, and means for releasing said balls from frictional engagement with said raceways when said operating and control members are coupled in direct drive relation.

4. In combination, a control member, an operating member, an inner ball raceway arranged to be rotated with said operating member, an outer stationary raceway, means including a plurality of balls positioned within said raceways for driving said control member from said operating member at a reduced speed, means for coupling said control and operating members in direct drive relation, a member mounted on said control member and provided with a cam surface, and means including a finger mounted on said operating member and arranged to engage said cam surface for releasing said balls from frictional engagement with said raceways when said operating and control members are coupled in direct drive relation.

5. In combination, a control member, an operating member provided with a ball raceway, a stationary ball raceway, means including a plurality of balls positioned within said raceways for driving said control member from said operating member at a reduced speed, means for coupling said operating and control members in direct drive relation, a member mounted on said control member and provided with a cam surface, and means including a finger mounted on said operating member and arranged to engage said cam surface during rotation of said operating member for releasing said balls from frictional engagement with said raceways when said operating and control members are coupled in direct drive relation.

6. In combination, a control member, an operating member, a reduction drive connection between said control member and said operating member, said connection including frictionally engaging surfaces, and means responsive to movement of said operating member through a predetermined range to release said frictionally engaging surfaces and to establish a direct drive connection between said members.

7. In combination, a rotatable driven member, a rotatable driving member, an epicyclic driving connection between said driving member and said driven member whereby said driven member is rotated at a reduced rate of speed relative to the rotation of said driving member, said connection including a plurality of planetary members rotatable about the axis of said driving member as a center, and means responsive to rotation of said driving member through a predetermined range to establish a direct drive connection between said driving and said driven members.

8. In combination, a rotatable driving member, a driven member, an intermediate member, means to drive the driven member by said driving member in a reduced speed relation through movement of said intermediate member relative to both said driving and driven members, the movement of the intermediate member being about the axis of the driving member as a center, and means responsive to operation of the driving member through a predetermined range to drive the driven member at the same speed as said driving member.

9. In combination, a driving member, a driven member, a ball and race connection between said members to rotate said driven member at a speed lower than the speed of the driving member, and means automatically effective upon rotation of said driving member through a predetermined range to establish a direct drive connection between the driving and driven members thereby to rotate the driven member at the same speed as the driving member.

10. In combination, a driving member, a driven member, a ball and race connection between said members to rotate said driven member at a speed lower than the speed of the driving member, and means automatically effective upon rotation of said driving member through a predetermined range to establish a direct drive connection between the driving and driven members thereby to rotate the driven member at the same speed as the driving member, and means to release said ball and race connection when said direct drive connection is established.

11. In combination, a driving member, a driven member, a ball and race connection between said members to rotate said driven member at a speed lower than the speed of the driving member, and a member operated by the driving member and movable therewith to engage the driven member in response to rotation of said driving member through a predetermined range thereafter to rotate the driven member at the same rate as said driving member is rotated.

12. In combination, a driving member, a driven member, a ball and race connection between said members to rotate said driven member at a speed lower than the speed of the driving member, and a member operated by the driving member and movable therewith to engage the driven member in response to rotation of said driving member through a predetermined range thereafter to rotate the driven member at the same rate as said driving member is rotated, said members being so arranged that upon opposite movement of the driving member said last member disengages the driven member and the driven member is driven only through said ball and race connection.

13. In combination, a driving member, a driven member, an epicyclic connection between said members to drive said driven member at a speed lower than the speed of the driving member, and means to establish a direct drive connection between the driving and driven members when the driving member is operated to exceed a predetermined range thereby to drive the driven member at the same speed as the driving member, and means responsive to such operation of the driving member to exceed said predetermined range to operate the driving member out from driving relation with said epicyclic connection.

14. In combination, a rotatable driving member having different radii at different points along its length, a driven member, an epicyclic driving means between the driven member and a point on the driving member where said driving member has a certain radius to drive the driven member at reduced speed with respect to the speed of the driving member, and means responsive to predetermined movement of the driving member to operate said driving member longitudinally of itself to a position such that its radius at said point is smaller than said certain radius thereby to break the driving relation between said driving member and said epicyclic driving means.

15. In combination, a rotatable driving member, a driven member, a reduction drive connection between said members, means to establish a direct drive connection between said members in response to a predetermined movement of said driving member, and means to move said driving member longitudinally of itself when said direct drive connection is established and sufficiently to break said reduction drive connection.

16. In combination, a rotatable driving member, a driven member, means for coupling said driving and driven members in direct drive relation, and means for establishing a reduced speed drive connection between said driving and driven members, said last-named means including a plurality of balls engaging said driving member and movable about said driving member as a center, an inner raceway for said balls formed on the surface of said driving member, an outer stationary raceway engaging said balls and comprising a pair of relatively movable annular members having tapered bearing surfaces, and a pair of spring members respectively secured to said annular members and having resilient portions biasing said annular members toward one another thereby to retain said balls in substantially non-slipping engagement with said inner and outer raceways.

17. In combination, a rotatable driving member, a driven member, a connection between said members to drive said driven member at a speed lower than the speed of the driving member, and means to establish a direct drive connection between the driving and driven members after the driving member is rotated over a predetermined range in excess of one complete revolution, said last-named means comprising a first member movable with said driving member, a second member movable with said driven member, and at least one intermediate member, said members being constructed and arranged to engage each other successively in response to rotation of said driving member thereby to establish said direct driven connection between said driving and driven members after said driving member is rotated over said predetermined range.

18. In combination, an adjustable member, an operating member coupled to drive said adjustable member thereby to adjust the same, means for coupling said adjustable and operating members in reduced drive relation when said operating member is rotated over a range corresponding to a predetermined rotation of said operating member, and means for establishing a direct drive connection between said members, said last-named means comprising a first intermediate member rotatable with respect to said adjustable and operating members but arranged to make driving engagement with said adjustable member upon being rotated through a predetermined range in either direction, and a second intermediate member movable with said operating member and arranged to make driving engagement with said first intermediate member upon a predetermined rotation of said operating member in either direction.

DONALD R. DE TAR.